United States Patent [19]

Mason

[11] Patent Number: 4,694,426
[45] Date of Patent: Sep. 15, 1987

[54] ASYNCHRONOUS FIFO STATUS CIRCUIT

[75] Inventor: Kent L. Mason, Beaverton, Oreg.

[73] Assignee: NCR Corporation, Dayton, Ohio

[21] Appl. No.: 811,851

[22] Filed: Dec. 20, 1985

[51] Int. Cl.[4] ............................................. G11C 19/00
[52] U.S. Cl. ........................................ 365/78; 377/28; 377/66
[58] Field of Search ........................... 365/73, 78, 221; 377/28, 66, 75, 76, 77, 78

[56] References Cited

U.S. PATENT DOCUMENTS 3,953,838 4/1976 Gilberg et al. ......................... 365/78
4,156,288 5/1979 Spandorfer ............................ 365/78
4,459,681 7/1984 Ohtsuka ................................. 365/78

Primary Examiner—Joseph A. Popek
Attorney, Agent, or Firm—Wilbert Hawk, Jr.; Casimer K. Salys

[57] ABSTRACT

A FIFO status circuit suitable to detect the full or empty status of a RAM based FIFO which is asynchronously addressable by write and read access signals. The circuit detects whether the preceding addressing of the FIFO was a read or a write operation to determine whether the FIFO is empty or full. In one form, the trailing edges of the FIFO write and read signals trigger respective pulse generators. Short duration matched pulses drive the corresponding set and reset inputs of a flip-flop. The out Q and Q̄ outputs from the flip-flop are coupled individually to a pair of AND gates. Each AND gate is also driven by a FIFO equal signal, a signal which indicates that both the read pointer and write pointer of the FIFO memory are directed to the same address. Because the FIFO equal signal is stable before the pulses reach the flip-flop, it serves to mask metastable conditions which may arise in the flip-flop. The flip-flop defines whether the previous operation was a read or write, and as such when combined by the AND gates defines whether the matching of the FIFO address pointers corresponds to a memory full or empty state.

15 Claims, 6 Drawing Figures

ASYNCHRONOUS FIFO STATUS CIRCUIT

BRIEF SUMMARY

The present invention relates to an electronic circuit, and more particularly to an electronic circuit operable in conjunction with a first in - first out (FIFO) type memory in which the writing of data into and the reading of data out of the FIFO are not synchronized. The particular circuit to which the invention is directed detects the FIFO status, namely, whether it is empty, full, or in neither state. The present asynchronously operable FIFO status circuit is preferably used in conjunction with a random access memory which is addressed by two pointers, the first pointer indicating the current write location and the second pointer indicating the current read location, from within the various addressable memory locations.

According to one practice of the invention, the trailing edges of the signals representing the FIFO write and FIFO read commands are used to enable respective edge triggered pulse generators, the outputs of which are individually connected to the set and reset inputs of a set-reset (S-R) flip-flop. The flip-flop is set when it receives a write pulse and reset when it receives a read pulse. The Q and Q\ (representing the inverse of Q) outputs of the flip-flop are individually connected to the inputs of independent AND gates, which are both logically enabled by a common FIFO equal input signal. The presence of an output signal from the AND gate receiving the Q\ signal indicates that the FIFO is in an empty state, while a signal at the output of the other AND gate, receiving the Q signal, indicates that the FIFO is in a full state. When the outputs of both AND gates are low, the FIFO is considered to be partially full. Metastable states within the S-R flip-flop arising from a time coincidence of the asynchronous write and read pulses are not propagated to the status outputs because of the masking effects of the FIFO equal signal, a signal which is stable high or low at the time the flip-flop is enabled by virtue of the equal logic being leading edge responsive.

The ability of the circuit to consistently determine the FIFO status in an asynchronous environment is particularly useful for an application in which the FIFO serves as a buffering memory interfacing microprocessors or communications systems operating at independent clock rates. The functional features of the circuit may be embodied in various forms of digital logic, including MOS type integrated circuits. These and other beneficial aspects of the invention will be more fully understood and appreciated upon considering the detailed description which follows.

DETAIL DESCRIPTION

The configuration of a FIFO memory using an indexed pointer random access memory (RAM) is relatively well known by those who routinely practice in the art. According to a representative configuration, the selection of write and read addresses for the RAM is performed by two pointers. The first/write pointer designates the address for the next word to be written into the RAM, and an independently incremented second/read pointer designates the address of the next word to be read out from the RAM. The respective addresses designated by the pointers are incremented to the next successive location each time a write or read operation is performed, in such a way that the relevant pointer is positioned to the next location immediately following a FIFO write/read cycle. In this way the RAM address pointers progress through the addressable memory with the write pointer preceding the read pointer, and both wrapping around to the lowest addressable location after accessing the highest addressable location.

When both pointers are designating the same address the FIFO status is ambiguous, in that the FIFO can be either full or empty. The ambiguity as to the status is further complicated if the write and read operations are permitted to arise asynchronously, namely, where either operation can coincide with or precede the other. Furthermore, where the FIFO RAM has been configured to provide concurrent write and read capability, such as with a dual port RAM, it is important that the FIFO status circuit not become metastable during overlapping write-read cycles. For that reason, the mere detection of whether the preceding cycle was a read or a write operation is not adequate for an asynchronous, dual port FIFO RAM configuration.

Figure 1:
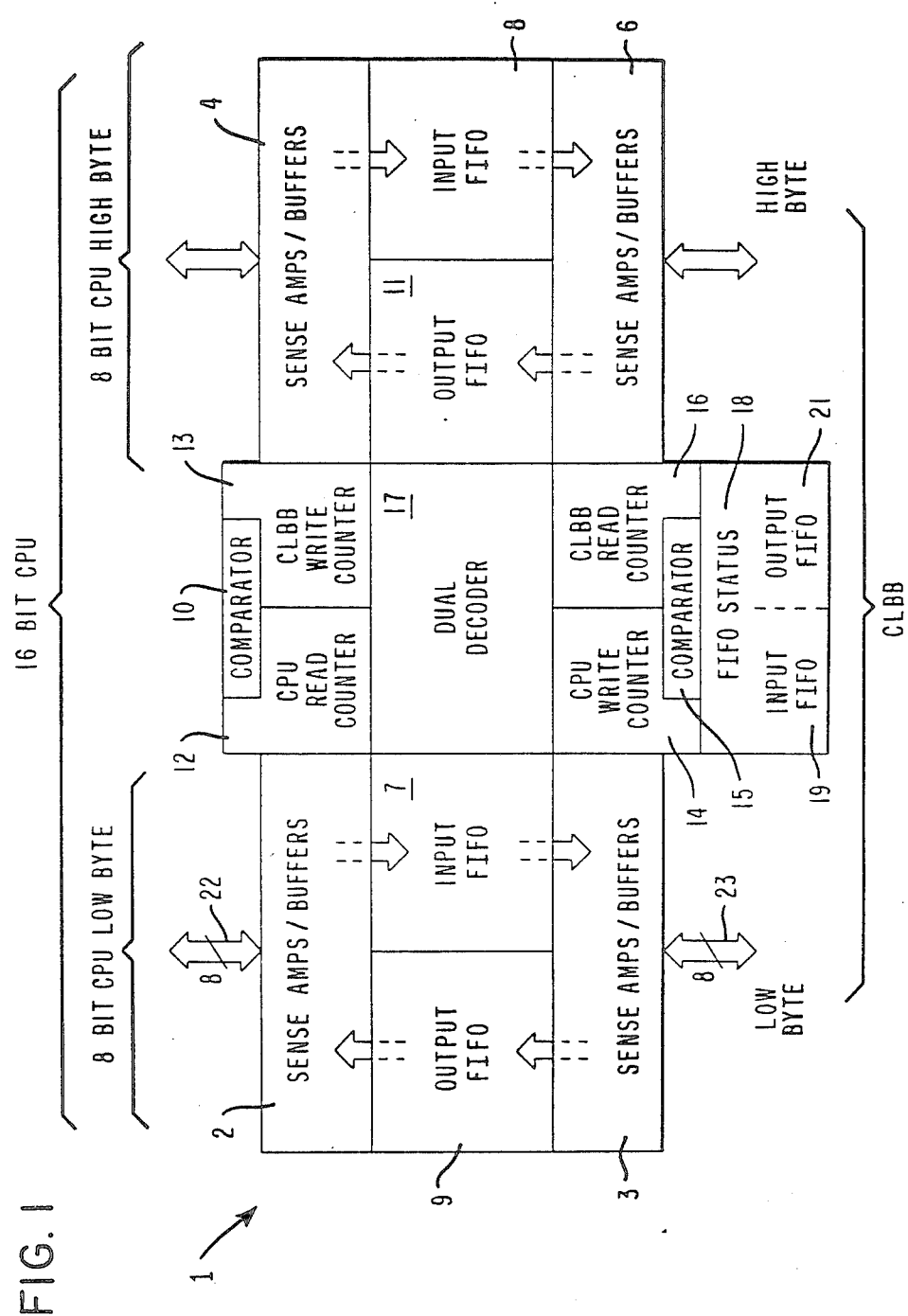
FIG. 1 is a schematic block diagram of an asynchronously operable interface circuit between two microprocessors.

A typical application for a FIFO status circuit capable of asynchronous operation is depicted in FIG. 1 of the drawings. As embodied, interface circuit 1 provides a communications link between a first microprocessor, identified here as CLBB, communicating over bus 23, and a second microprocessor, identified as CPU, communicating over bus 22, where for purposes of flexibility the CPU bus is defined to be either 8 or 16 bits wide. For purposes of describing the features of the invention, the ensuing development will focus on interfacing an 8 bit CPU on the low byte side of the configuration.

The functional blocks which make up the whole of interface 1 include sense amplifier/buffer blocks 2, 3, 4, 6; input FIFO memories 7 and 8; output FIFO memories 9 and 11; CPU read counter 12; CLBB write counter 13; comparator 10; CPU write counter 14; CLBB read counter 16; comparator 15; dual decoder 17; and composite FIFO status circuit 18, which status circuit is itself made up of an input FIFO status circuit 19 and an output FIFO status circuit 21.

To appreciate the unique features of the present invention, it is of value to understand how the CPU and CLBB communicate through interface 1. First, it should be noted that the timing of the CPU communications and the timing of the CLBB communications are referenced to clock signals which are not synchronized one to another. Therefore, as one example, it is possible for output FIFO 9 to be simultaneously read by the 8 bit CPU and written by the CLBB, the concurrent operation being attributed to the capability of the dual decoder 17. Likewise, input FIFO 7 can be subjected to independent or overlapping CPU write and CLBB read operations. However, as one skilled in the art would no doubt appreciate, the CPU or CLBB can only read or write during any one time interval by virtue of the shared use of busses 22 and 23. It will no doubt also be appreciated, that input FIFO 7 and output FIFO 9 are two independent memories, and are coupled by sense amp/buffer blocks 2 and 3 to respective busses 22 and 23 in such a way that when information is to move from CPU bus 22 to CLBB bus 23 the sense amps in block 2 and buffers in block 3 are concurrently enabled, CPU write counter 14 and CLBB read counter 16 provide the pointers for dual decoder 17, and the input FIFO status is determined by input FIFO section 19. In the case where information is to move from CLBB bus 23 to CPU bus 22, the sense amps in block 3 and the buffers in block 2 are enabled, CPU read counter 12 and CLBB write counter 13 provide the pointers for dual decoder 17, and the output FIFO status is determined by output FIFO section 21 of composite FIFO status block 18.

For the ensuing discussion consider a single FIFO memory, selected here to be input FIFO 7, for which the sense amps of block 2 and the buffers of block 3 are enabled, while dual decoder 17 is responsive to address pointers provided by CPU write counter 14 and CLBB read counter 16. For that configuration the FIFO status will be determined by input FIFO section 19.

Figure 2:
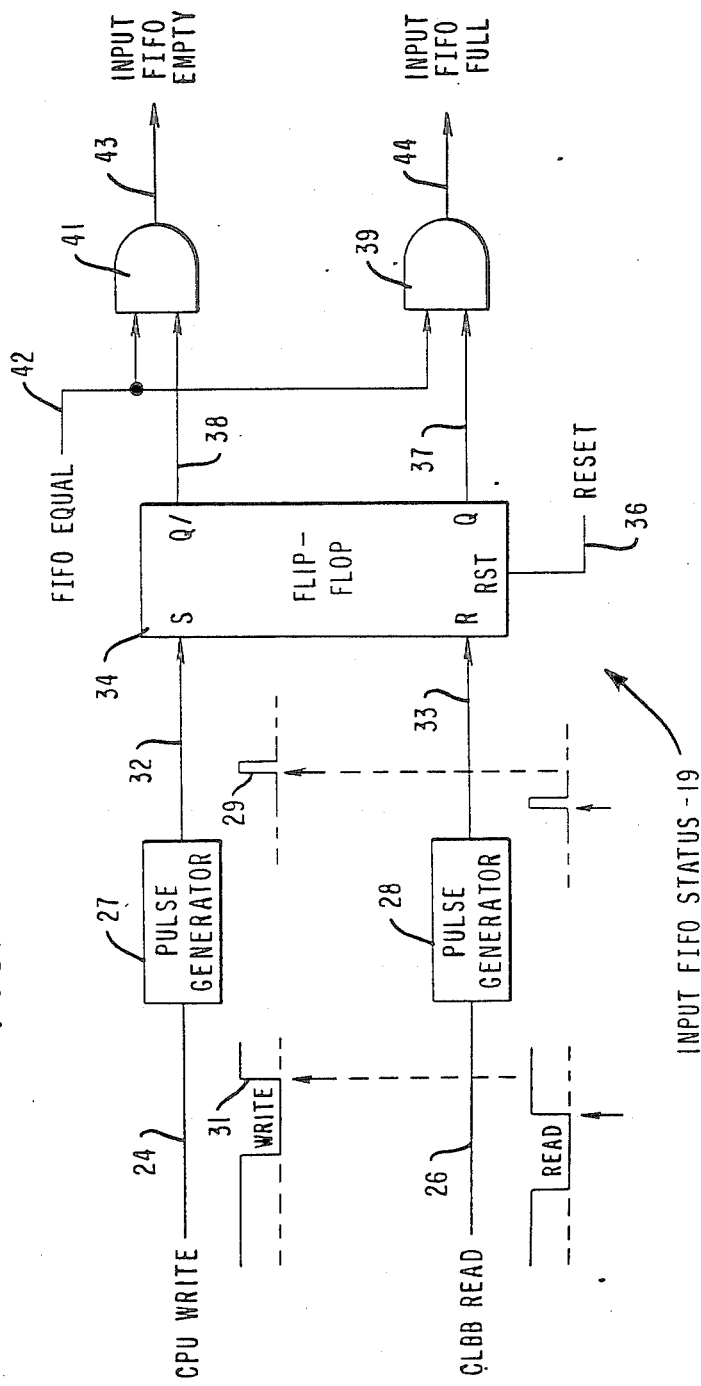
FIG. 2 is a functional schematic of the asynchronous FIFO status circuit.

A functional embodiment of the preferred input FIFO status circuit is depicted in FIG. 2 of drawings. As so configured, the status circuit 19 determines the full or empty state of the FIFO memory by considering, among other factors, whether the immediately preceding operation was a FIFO write or a FIFO read. It can no doubt be understood that if the read pointer and write pointer of the FIFO are equal the status of FIFO is ambiguous, in that the read pointer could have caught up with the write pointer, representing a FIFO empty condition, or the write pointer could have looped around and caught up the read pointer, representing a FIFO full condition. A consideration of the immediately preceding operation to determine whether it was a read or write becomes determinative as to whether match of the read and write pointers, causing in FIG. 2 a FIFO equal signal, represents a full or an empty FIFO memory state. However, the determination of the previous FIFO operation in a dual port, asynchronous write/read FIFO application is significantly more complex. By definition this is the structural configuration to which the present invention is directed.

To overcome the constraints imposed by asynchronous write/read operations the functional block diagram in FIG. 2 first converts the write/read signals to short pulses using astable multivibrators triggered by the trailing edges of the read or write signals. With the pulses being short, they are less likely to overlap in time, and being trailing edge triggered, any responses thereto occur after the corresponding write or read dynamics have decayed. The write and read pulses enable the opposite sides of an S-R flip-flop, the output of the flip-flop being further combined in an AND configuration with an enabling FIFO equal signal.

Considering the functional block diagram in FIG. 2 in greater detail, note that input FIFO status circuit 19 receives asynchronous CPU write signals and CLBB read signals on respective lines 24 and 26. Astable multivibrators 27 and 28, designated as being pulse generators in the figure, convert the respective write and read signals into trailing edge triggered pulses. For example, the leading edge 29 of the CPU write pulse is substantially coincidence with the trailing edge 31 of the CPU write signal. A similar situation exist for the CLBB read signal and its corresponding pulse. As embodied, the CPU write and CLBB read signals are nominally 150 to 200 nanoseconds in duration, while the CPU write and CLBB read pulses on lines 32 and 33 are nominally 20 to 60 nanoseconds in duration.

The CPU write and CLBB read pulses on respective lines 32 and 33 are connected to the set and reset inputs of S-R flip-flop 34, of relatively conventional configuration. The flip-flop 34 has a reset line 36, a Q output on line 37 and a Q\ output on line 38. The Q and Q\ output signals on lines 37 and 38 are connected individually as the inputs to respective AND gates 39 and 41. The second input to each of the AND gates 39 and 41 is a FIFO equal signal, furnished by line 42. The FIFO equal signal is generated when the CPU write pointer, generated by CPU write counter 14 of FIG. 1, and the CLBB read pointer, generated by CLBB read counter 16 in FIG. 1, are numerically identical. Since the circuit implementation of a binary address comparator is relatively well known, no attempt has been made to depict the structure thereof.

With the functional architecture of the asynchronous FIFO status circuit at hand by way of FIG. 2, it is important to next appreciate why this particular combination of features provides the desired performance characteristics. First, note that pulse generators 27 and 28 are configured to respond to the trailing edges of the CPU write or CLBB read signals. This insures that the status circuit makes no determination until the conclusion of the FIFO addressing cycle which initiates a status reevaluation. With reference to the structure depicted in FIG. 1, it should be recognized that dual decoder 17 permits simultaneous reading and writing of input FIFO 7, in that FIFO 7 has attributes of a dual port RAM. The use of a trailing edge trigger provides the time necessary for comparator 15 in FIG. 1 to stabilize the state of the FIFO equal signal. A stable FIFO equal signal on line 42 in FIG. 2. thereafter serves to mask, in a manner to be described in more detail hereinafter, any metastable conditions created in flip-flop 34 by overlapping write-read signals. The formation of short duration write and read pulses by generators 27 and 28 on respective lines 32 and 33 further reduces the likelihood of signal overlaps. The generation by blocks 27 and 28 of pulses substantially matched in duration upon the trailing edge of the write-read signals also avoids unduly short FIFO empty or FIFO full signals, which might otherwise be created with selected overlaps and duration mismatches in the write and read signals. The outputs from pulse generators 27 and 28 are coupled to the respective set and reset inputs of S-R flip-flop 34 in such a way that the flip-flop is set upon a CPU write operation and is reset upon a CLBB read operation. The output of a flip-flop is used to designate which operation was last performed on the FIFO memory. If a read was performed immediately preceding the formation of a FIFO equal signal, the FIFO is empty following the read cycle. In contrast, if a CPU write cycle leads to the creation of a FIFO equal signal, the FIFO would be in a full status thereafter.

AND gates 39 and 41 are responsive to the coexistance of a FIFO equal signal on line 42 with a set signal from flip-flop 34 on lines 37 or, in the alternative, with a reset signal from flip-flop 34 on line 38. The presence of a set in conjunction with a FIFO equal signal provides an output from AND gate 39 to indicate that the input FIFO is full, while a reset in combination with FIFO equals provides an output from AND gate 41 to indicate that the input FIFO is empty. Note that the input FIFO empty and input FIFO full status signals on output lines 43 and 44 are low whenever the write and read pointers are not equal, indicating that the FIFO memory is neither empty nor full.

To more fully appreciate the ability of the circuit to satisfy all operational conditions, consider the two situations for the CPU write and CLBB read signals. As would be expected, the two signals are assumed to follow the protocol of the system within which they operate, so that the CLBB will not attempt to read a FIFO it knows to be empty and the CPU will not write the FIFO when it knows it to be full. Under such conditions, if the CPU write and CLBB read signals are nonoverlapping, which would be the simple case, the pulse generators, flip-flop, and AND gates would operate in the standard manner. The other situation for this circuit exists when the CPU write and CLBB read signals are very close in the timing of their trailing edges, so as to create an overlap of the short duration pulses on lines 32 and 33. However, according to the protocol, the concurrence of a CPU write signal and a CLBB read signals can only occur if the pointers were not previously equal, namely, where the FIFO was not previously full or empty, for if the FIFO had previously been in a full or empty state one or the other of the read-write signals would not be present. Thus it can be said that when the CPU write and CLBB read signals overlap or coincide, both pointers of the FIFO will be incremented and the final status of the FIFO will remain unchanged. To avoid inadvertent signals during the transient period of overlapping set and reset signals, recognizing the metastable state then created in flip-flop 34, the present circuit provides masking to the Q and Q\ outputs of flip-flop 34 by way of AND gates 39 and 41 whenever the FIFO pointers are unequal. Thus, even if S-R flip-flop 34 became metastable, according to the protocol the FIFO equal signal on 42 would remain low and avoid the transmission of a spurious signal through either AND gate 39 or 41. Thereby, the masking by the FIFO equal signal inhibits the spurious signals which might arise by virtue of the asynchronous operation.

FIFO reset 36 is enabled whenever the FIFO memory is emptied by a command or initial "power on" signal, a signal which would also be used to reset the pointers and thereby generate a FIFO equal signal on line 42 and an input FIFO empty signal on line 43.

Figure 3A:
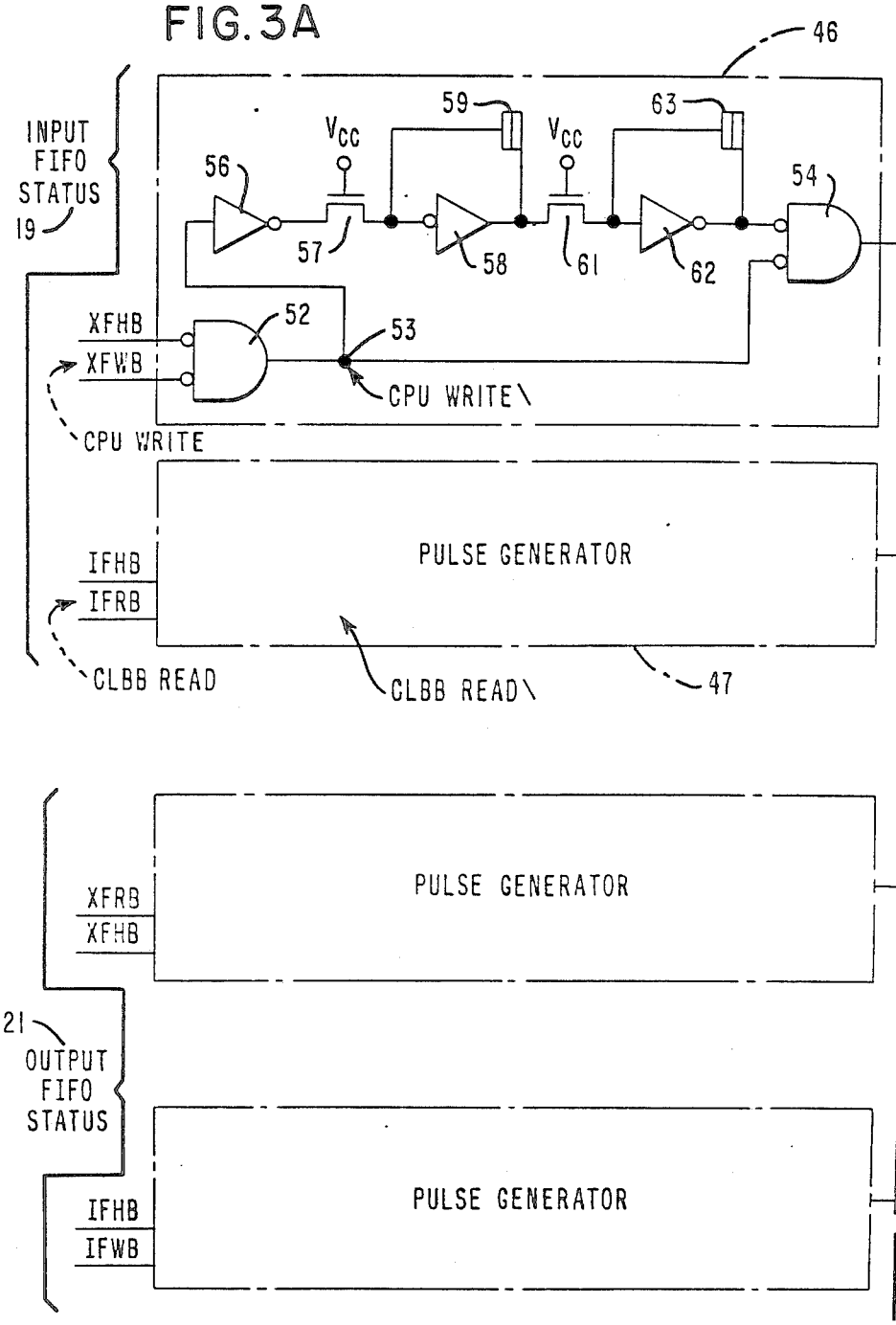
FIGS. 3A and 3B schematically depict the integrated circuit implementation of two asynchronous FIFO status circuits.
Figure 3B:
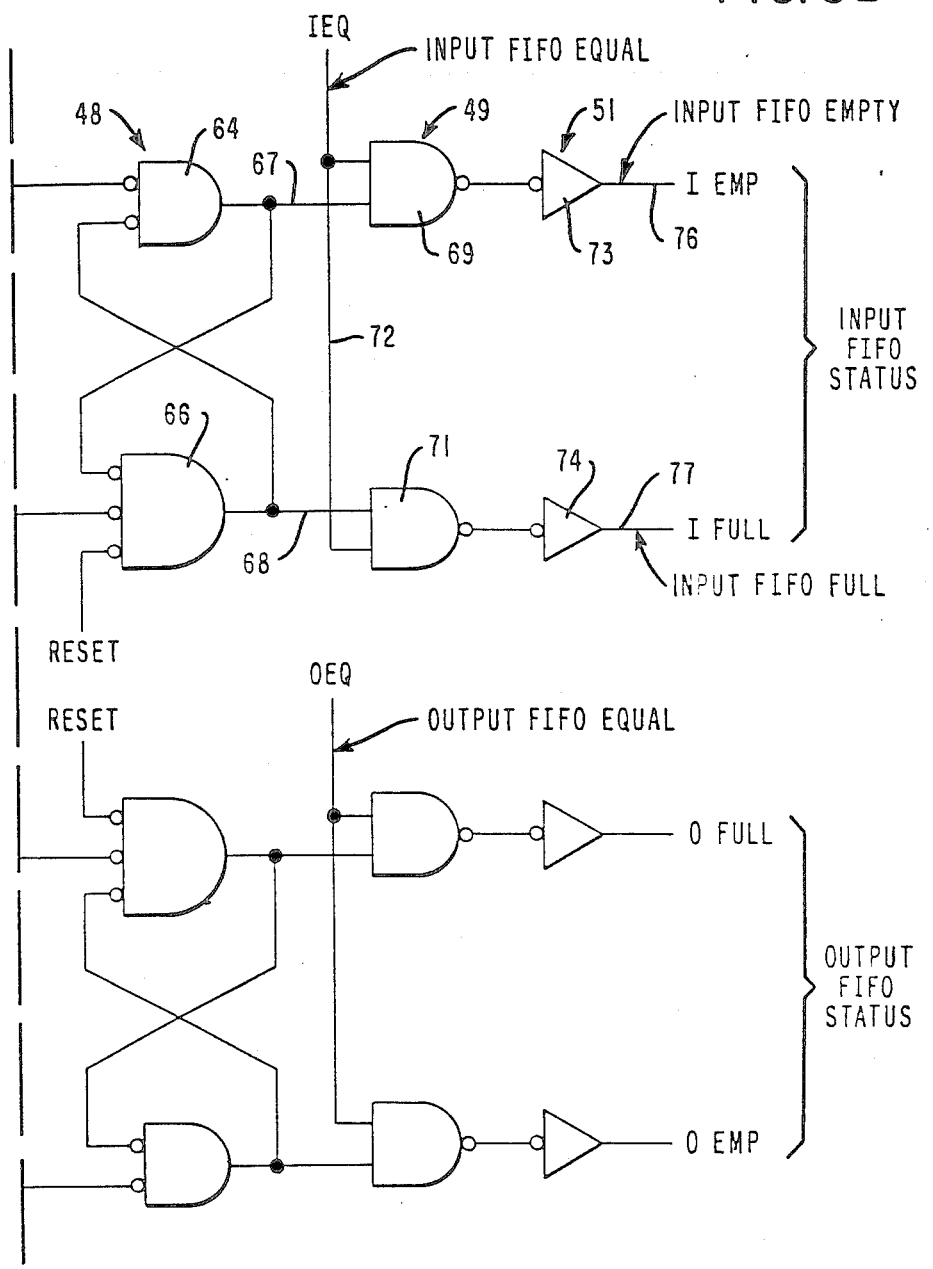

An integrated circuit implementation of the FIFO status circuit, using field effect transistors, for the interface system depicted in FIG. 1 appears schematically in the composite of FIGS. 3A and 3B. In particular, note the presence of the input FIFO status section 19 in the upper halves of FIGS. 3A and 3B, and the presence of output FIFO status section 21 in the lower halves of the figures.

To understand the correspondence of function and structure which relate FIGS. 2, 3A and 3B, compare the arrangement of the pulse generators, flip-flops, and AND gates in FIG. 2 with CPU write pulse generator 46, CLBB read pulse generator 47, S-R flip-flop 48, NAND gate 49, and amplifier 51, as depicted in FIGS. 3A and 3B. Pulse generator block 46 in FIG. 3A is comprised of NAND gate 52, which receives as its input the CPU write signal XFWB and, as embodied, a corresponding XFHB signal for enabling the high byte section of the interface system depicted in FIG. 1. For the purposes of this embodiment, the status and counters are updated only when a high byte access is done. The CPU write/signal at node 53 is transmitted directly to NAND gate 54 along one path and indirectly, by way of delay stages, along another path. As presently embodied, the delay path is made up of inverter 56, resistive pass FET 57, inverter 58, depletion FET configured feedback capacitor 59, resistive pass FET 61, inverter 62 and another depletion FET feedback capacitor 63. The resistive effect of field effect transistors 57 and 61 are combined with respective feedback capacitors 59 and 63 in inverters 58 and 62 to produce the time delay between the commencement of the pulse, upon the trailing edge of the CPU write signal, and its termination approximately 20 to 60 nanoseconds later. As shown below with respect to pulse generator 47, the CLBB read signal is provided to the lead identified as IFRB, with IFHB receiving the corresponding high byte enable signal.

The output from NAND gate 54 of pulse generator 46 is provided to NAND gate 64 in FIG. 3B, which makes up one side of S-R flip-flop 48, while NAND gate 66 is correspondingly driven by pulse generator 47 to drive the other half of S-R flip-flop 48. The outputs from the flip-flop are provided on lines 67 and 68 to respective NAND gate 69 and 71, the masking signal being provided thereto as an input FIFO equal signal on line 72. The circuit concludes with inverting buffer amplifiers 73 and 74 to provide on lines 76 and 77 respective FIFO empty and FIFO full signals. Note the structural correspondence of the output FIFO status section 21 (FIG. 1) as depicted in the lower halves of FIGS. 3A and 3B.

Figure 4A:
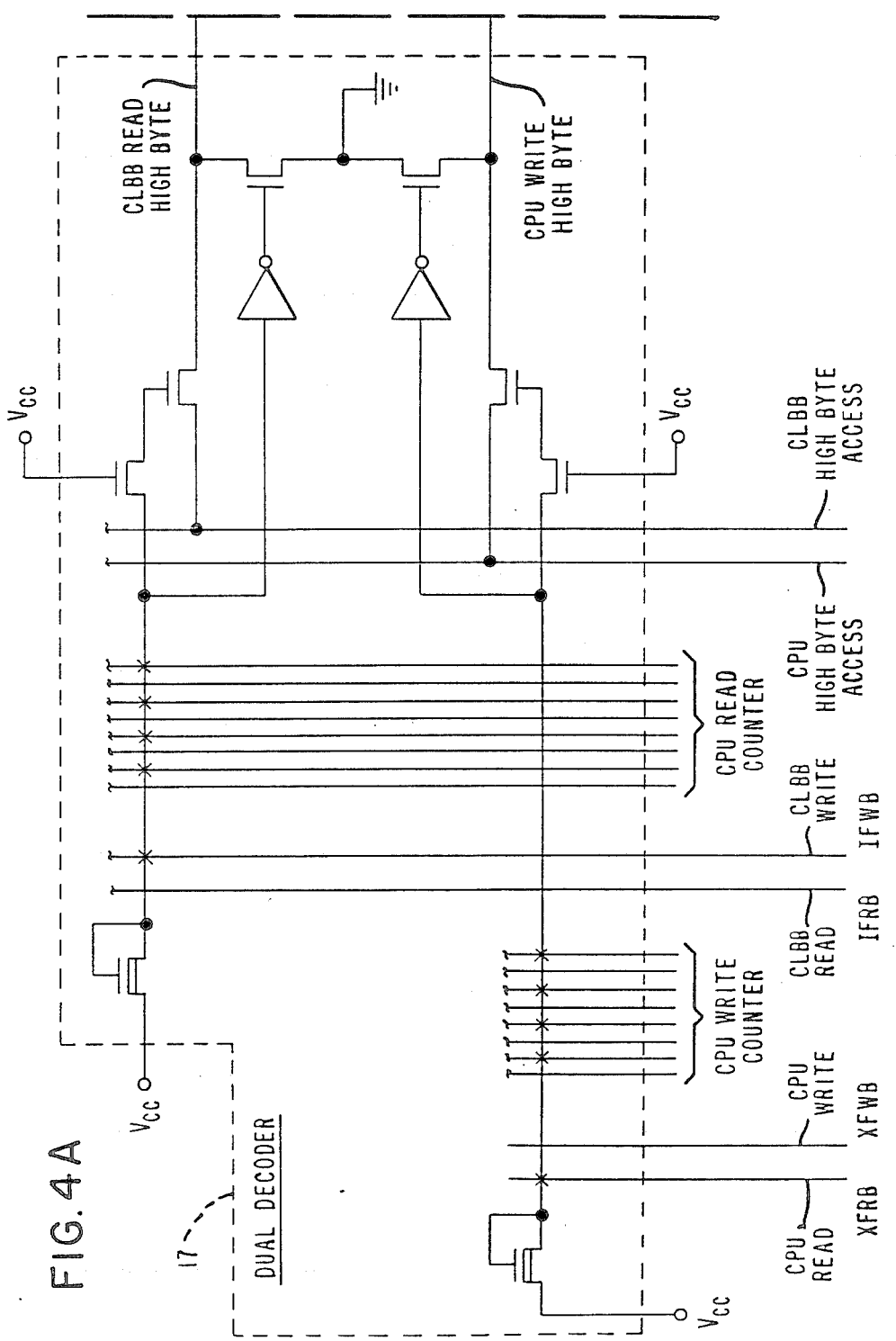
FIGS. 4A and 4B schematically depict the MOS implementation of various connective elements from the functional blocks in FIG. 1.
Figure 4B:
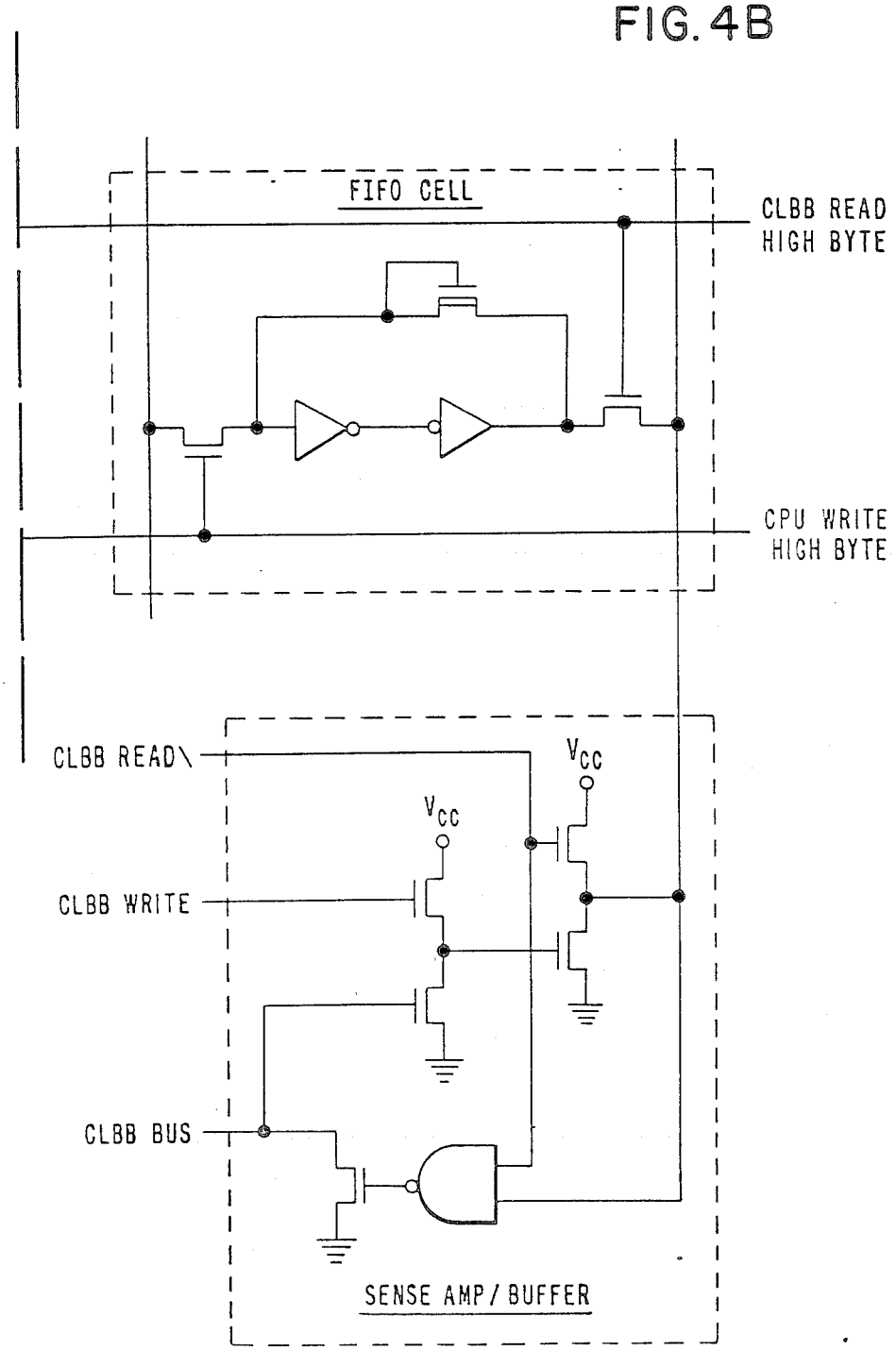

Any illustrative arrangement by which commonly known entities such as the CPU write counter 14, CLBB read counter 16, and dual decoder 17 in FIG. 1, might be connected to less appreciated elements such the sense amps and buffers in block 3, or the FIFO cells in block 7, is depicted by components in FIGS. 4A and 4B. The circuit in FIG. 4A depicts a representative section of dual decoder 17 in FIG. 1. A representative FIFO cell is depicted in the upper half of FIG. 4B, while the lower half of the FIG. 4B illustrates a representative sense amp/buffer circuit. The integrated circuit elements illustrated in FIG. 4 are drawn from input FIFO 8 and sense amp/buffer block 6 as originally depicted in FIG. 1 of the drawings.

It will no doubt be understood and appreciated that the focus of the attention is on the asynchronous FIFO status circuit functionally depicted in FIG. 2, which according to the present teaching can be embodied in a myriad of different structural arrangements to provide the combination of trailing edge triggering, short and matched duration pulse generation, alternating enablement of a flip-flop, and masked combination with a FIFO equal signal to signify by way of logic blocks either a FIFO empty or a FIFO full state.

I claim:

1. A status circuit for determining which of two asynchronously operable counters were last incremented following the detection of correspondence in the count status, comprising;

means for generating a set signal upon the conclusion of an incrementing signal to the first counter;

means for generating a reset signal upon the conclusion of an incrementing signal to the second counter;

means for detecting a correspondence of the numerical counts in the first and second counters and generating a correspondence signal thereupon;

a bistable multivibrator switching to a first state to provide a first signal following the receipt of the set signal, and switching to a second state to provide a second signal following the receipt of the reset signal; and signal masking means for receiving the correspondence signal and for multiplexing the first and second state signals responsive thereto to identify the last incremented counter.

2. The apparatus recited in claim 1, wherein the means for detecting the correspondence of the numerical counts is responsive to leading edges of the incrementing signals provided to the first and second counters.

3. The apparatus recited in claim 2, further comprising protocol means for inhibiting the incrementing of the last incremented counter following the generation of the correspondence signal.

4. The apparatus recited in claim 3, wherein the first and second counters increment upon the leading edges of the respective incrementing signals.

5. The apparatus recited in claim 4, wherein the durations of the generated set and reset signals are nominally less than 40% of the durations of the corresponding counter incrementing signals.

6. The apparatus recited in claim 5, wherein the means for generating the set and the reset signals are monostable multivibrators, the bistable multivibrator is an S-R flip-flop, and the signal masking means are two AND gates respectively forming a logic combination of the first state signal and the correspondence signal in the first AND gate, and a logic combination of the second state signal and the correspondence signal in the second AND gate.

7. A status circuit for a FIFO memory which is asynchronously operable utilizing incremented write and read pointers for addressing, comprising:

means for generating a set signal upon the conclusion of a write signal;

means for generating a reset signal upon the conclusion of a read signal;

means for detecting correspondence of the numbers in the write and read pointers and generating a correspondence signal thereupon;

a bistable multivibrator providing a first state signal following the receipt of the set signal and providing a second state signal following the receipt of the reset signal; and signal masking means for receiving the correspondence signal and for multiplexing the first and second state signal responsive thereto.

8. The apparatus recited in claim 7, wherein means for detecting correspondence of the numbers in the write and read pointers is responsive to the leading edges of the write and read signals.

9. The apparatus recited in claim 8, wherein the means for detecting correspondence is a comparator, and the write and read pointers designate addresses within the FIFO memory.

10. The apparatus recited in claim 9, further including a dual port address decoder for the FIFO memory suitable to perform concurrent FIFO memory write and read operations.

11. The apparatus recited in claim 10, further including protocol means for inhibiting a write operation when such write operation would follow in direct succession a preceding write operation which caused the generation of the correspondence signal, and for inhibiting a read operation when such read operation would follow in direct succession a preceding read operation which caused the generation of a correspondence signal.

12. The apparatus recited in claim 11, wherein the write and read pointers are counters which increment to the next successive addresses upon the leading edges of the respective write or read signals.

13. The apparatus recited in claim 12, wherein the pointer counters continuously loop through the FIFO addresses.

14. The apparatus recited in claim 13, wherein the durations of the set and reset signals are nominally less than 40% of the durations of the corresponding write and read signal.

15. The apparatus recited in claim 14, wherein the means for generating the set and reset signals are monostable multivibrators, the bistable multivibrator is an S-R flip-flop, and the signal masking means are two AND gates respectively forming a logic combination of the first state signal and the corresponding signal in the first AND gate, and a logic combination of the second state signal and the corresponding signal in the second AND gate.

* * * * *